United States Patent [19]

Pöllinger et al.

[11] 4,226,481
[45] Oct. 7, 1980

[54] SPRING-LOADED BRAKE DEVICE FOR RAILWAY VEHICLES

[75] Inventors: Hans Pöllinger; Paul Lohmeier, both of Munich, Fed. Rep. of Germany

[73] Assignee: Knorr-Bremse GmbH, Munich, Fed. Rep. of Germany

[21] Appl. No.: 896,570

[22] Filed: Apr. 14, 1978

[30] Foreign Application Priority Data

Apr. 20, 1977 [DE] Fed. Rep. of Germany ....... 2717560

[51] Int. Cl.² .............................................. B60T 17/04
[52] U.S. Cl. ...................................... 303/82; 137/115
[58] Field of Search ................. 303/82, 86, 37, 38, 303/27, 29, 69, 7; 137/115

[56] References Cited

U.S. PATENT DOCUMENTS 2,861,587 11/1958 Hursen ................................. 303/82

Primary Examiner—Edward R. Kazenske
Assistant Examiner—Reinhard J. Eisenzopf
Attorney, Agent, or Firm—Edmund M. Jaskiewicz

[57] ABSTRACT

A spring-loaded brake device particularly for railway vehicles has a brake valve to control the pressure in a brake line and spring-loaded brake cylinders that can be subjected to the action of pressure in the brake line against the force of a loading spring. At least one venting valve is connected to the brake line and the venting valve comprises a rapid acting valve which is controlled by pressure in the brake line to open a venting passage from the brake line to the atmosphere only when the pressure in the brake line is lowered from a brake release level to a level at which the brake cylinder makes braking contact. This venting passage is otherwise closed. The rapid acting valve thus removes air under pressure from the spring-loaded brake cylinders and flows this air to the atmosphere only at the beginning of a braking operation. Upon further application of the brakes the rapid acting valve has no effect and brake pressure is controlled by the brake valve.

14 Claims, 5 Drawing Figures

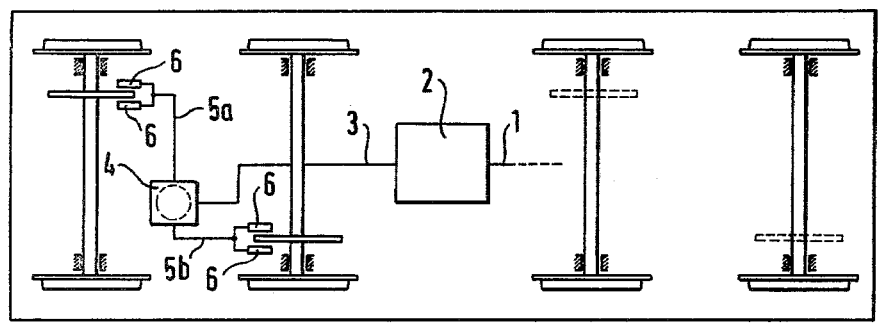
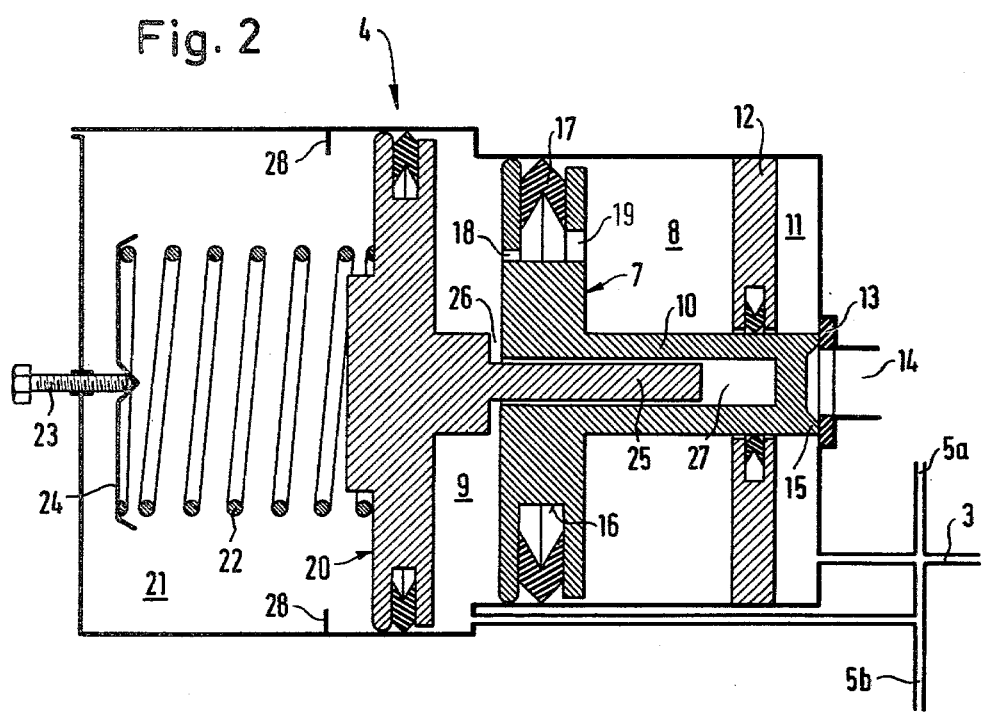

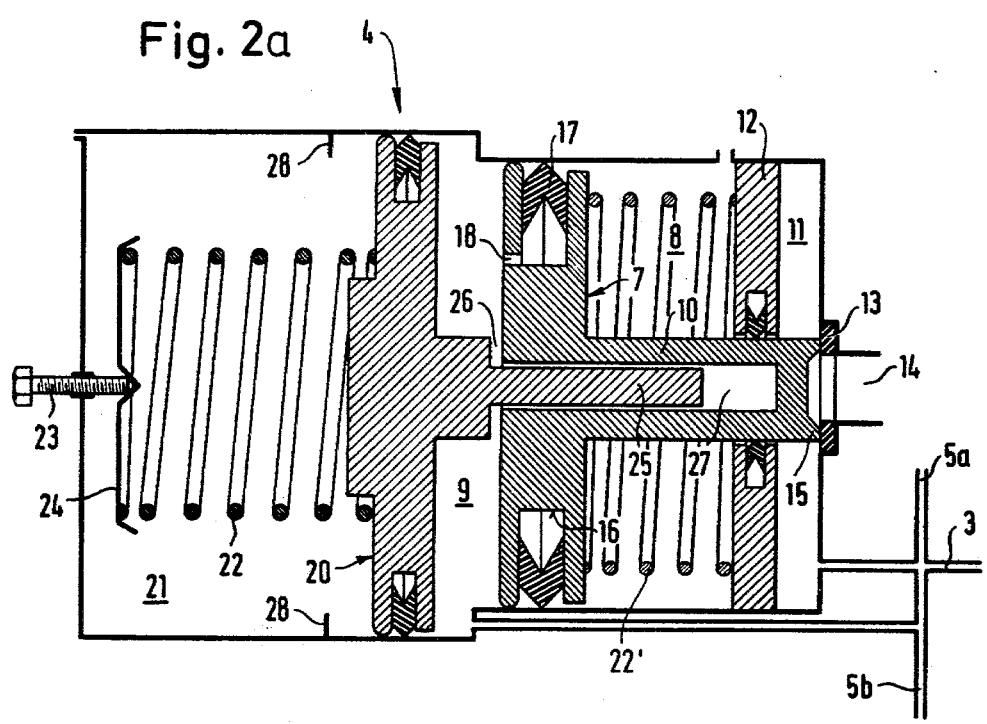

SPRING-LOADED BRAKE DEVICE FOR RAILWAY VEHICLES

The present invention relates to a spring-loaded brake device in a railway vehicle and connected to a brake line to which is further connected a spring-loaded brake cylinder and a brake valve to control pressure in the brake line, more particularly, to the structure and operation of a venting valve connected to the brake line.

Spring-loaded brake devices, such as have been used on railway vehicles, include a spring-loaded brake cylinder which is subjected to the action or pressure in a brake line against the force of a loading spring. A brake valve is provided to control the pressure in the brake line to initiate a braking operation. When a braking operation is initiated, a large quantity of air under pressure must be removed from the spring-loaded brake cylinders in order to bring about a contact of the brake shoes with the braking surfaces and to subsequently tighten the brakes so that the brake shoes apply more force to the braking surfaces to increase the braking effect. In order to rapidly remove such large quantities of compressed air, a venting valve is generally connected to the brake line and this valve is preferably arranged as close as possible to the spring-loaded brake cylinders. The venting valve generally comprises an ordinary, rapid venting or a relay valve.

As result of this construction of the venting valve the air under pressure escapes from the spring-loaded brake cylinders through the venting valve directly to the atmosphere rather than having to flow through the entire brake line as well as through the brake valve. Such venting valves are unsatisfactory, since the area of the valve opening must be relatively large to accommodate the large quantity of compressed air to be removed from the spring-loaded brake cylinders up to the time that braking contact is first effected, but subsequently substantially smaller quantities of air must be removed from the brake cylinders when the braking operation is continued and braking force is increased. Presently known venting valves which have a relatively large cross-section of the opening to the atmosphere can remove such smaller quantities of air with a relatively poor accuracy and precision and under such conditions that would result in undesirable noise.

It is therefore the principal object of the present invention to provide a spring-loaded brake device of the type described above having an improved venting valve.

It is another object of the present invention to provide such a spring-loaded brake device which enables a large quantity of air to be quickly exhausted from the spring-loaded brake cylinders at the beginning of the braking operation to provide a rapid response of the spring-loaded brake device and at the same time provide for an accurate and precise regulation of braking force after brake contact has been established.

It is a further object of the present invention to provide such a spring-loaded brake device which will enable air to be rapidly exhausted at the beginning of the braking regulation and which will permit air to be accurately exhausted at a much lower rate after brakes have been applied without undue vibration and noise.

In order to accomplish the abovementioned objects, a venting valve is provided which permits a rapid application of the brakes controlled by pressure in the brake line and which opens a venting pasage from the brake line to the atmosphere only when the pressure in the brake line has been lowered from a brake release level to a pressure level at which brake contact is effected. Otherwise, the venting passage is closed. Such a valve which provides for a quick and rapid contact of the brakes removes compressed air from the spring-loaded brake cylinders to the atmosphere only at the beginning of the braking action. Upon further application of the brakes once brake contact has been effected the valve is without effect and the brake pressure is accurately controlled, in a manner as known in the art, by the brake valve.

According to one aspect of the present invention a venting valve or a spring-loaded brake, particularly in a railway vehicle and connected to a brake line to which is further connected a spring-loaded brake cylinder and a brake valve to control pressure in the brake line may comprise means for opening a passage from the brake line to the atmosphere only when the pressure in the brake line is decreased from a brake release level to a level at which braking contact of the brake cylinder is effected. Otherwise, this passage to the atmosphere is closed.

Other objects and advantages of the present invention will be apparent upon reference to the accompanying description when taken in conjunction with the following drawings, which are exemplary, wherein;

FIG. 1 is a schematic view of the underside of railway vehicle on which there is installed a spring-loaded brake device incorporating the venting valve of the present invention;

FIG. 2 is a schematic sectional view of a rapid brake contact valve according to the present invention for the springloaded brake device;

FIG. 2a is a view similar to that of FIG. 2 and showing a modification thereof;

Proceeding next to the drawings wherein like reference symbols indicate the same parts throughout the various views, a specific embodiment and modifications of the present invention will be described in detail.

Figure 3:
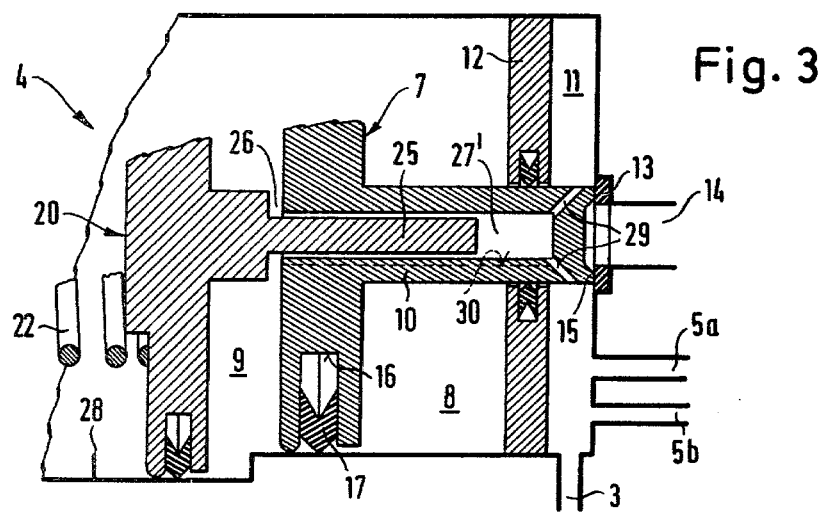
FIG. 3 is a view of a portion of the valve of FIG. 2 and showing a modification thereof.

As may be seen in FIG. 1, a control line 1 transmits a braking signal to a brake valve 2 which introduces a braking pressure inversely proportional to the degree of braking desired as transmitted by the braking signal into a portion 3 of a brake line 3, 5a, 5b. This brake pressure ranges between a brake release pressure of about 6 bar, a brake contact pressure of about 4.5 bar and a braking range extending up to 0 bar. Brake line portion 3 is connected to a rapid brake contacting or applying valve 4. Leading from the valve 4 there are brake line portions 5a and 5b which are connected to spring-loaded brake cylinder 6 of the vehicle braking system as known in the art. The spring-loaded brake cylinders 6 are of the general type in which a brake piston has one side thereof subjected to brake line pressure as introduced in lines 5a or 5b against the force of a loading spring acting in the direction of brake application. This piston is not shown in the drawings.

The valve 4 is of the type which functions to bring about a rapid application of the brakes. This is accomplished by moving the brake shoe into contact with the braking surface as quickly as possible when air is being evacuated from the brake cylinder in response to the braking signal.

The brake application valve 4 comprises a housing in which there is displaceably mounted a piston 7 on one side of which is a chamber 8 and the other side of which is a chamber 9. On the side of piston 7 toward chamber 8 is provided with a valve plunger 10 which slidably and sealingly passes through an opening formed in a partition 12 within the valve housing to define a chamber 11 with the end wall of the housing. The end wall of the housing is provided with an opening 14 which opens to the atmosphere and which is surrounded by a sealing ring 13.

One end of the plunger 10 extends into the chamber or valve space 11 and this end is provided with a valve seat 15 which is engageable with the sealing ring 13 to form a valve 13, 15 which controls the opening of the passage 14 from the valve chamber 11 to the atmosphere.

The piston 7 is provided with a radially extending annular groove 16 in which is positioned a substantially V-shaped piston packing or seal 17 constructed, as known in the art, to permit the flow of fluid pressure medium in one direction and not in the other direction to function as a check valve. The groove 16 is provided with a throttle or constricted opening 18 leading to the chamber 9 and with a larger bore or opening 19 leading into the chamber 8.

The chamber 9 is also defined by a second piston 20 which is opposed from the piston 7 and which has a somewhat larger diameter than the piston 7. The piston 20 separates the chamber 9 from a chamber 21 which is constantly vented to the atmosphere through a vent opening as indicated. Within the chamber 21 there is a compression spring 22 one end of which acts upon a face of the piston 20 to load the piston 20 in the direction toward the piston 7 and the other end of spring 22 rests upon a spring plate 24 whose position can be adjusted by an adjusting or set screw 23 threaded into an opening formed in an end wall of the valve housing. The side of the piston 20 facing toward the chamber 9 is provided with a coaxial plunger 25 in which there is formed an annular shoulder 26 to form an abutment coupling with the adjacent surface of piston 7. The remaining end portion of the plunger 25 is reduced in diameter and is slidably received in a blind bore 27 which is formed in both, the piston 7 and a portion of the plunger 10.

The brake line 3 is connected to both the chambers 9 and 11 as shown in FIG. 2 and portions 5a and 5b of the brake line branch off from the brake line portion 3 at a point closely adjacent to the valve 4.

When the brake is in its released condition, the brake valve 2 introduces a release pressure into the brake line 3, 5a and 5b which pressure is sufficient to maintain the loading springs of the spring-loaded brake cylinder 6 tensioned to maintain the brake in its released position in which it is spaced from the braking surface. Chamber 9 and valve 4 is also filled with compressed air at the release pressure through the brake line 3 and this release pressure also prevails in chamber 8 through the constriction 18. The valve chamber 11 is also subjected to the release pressure through its connection to brake line 3. The area of the surface of the piston 7 in chamber 8 is smaller than the area on the other side of the piston 7 facing toward chamber 9 by an amount equal to the cross-sectional area of the plunger 10. The piston 7 is thus a differential piston both sides of which are subjected to different forces. However, since the pressure on both sides of the piston 7 is the same, the force acting on the side of the piston facing toward chamber 9 is greater so that the piston 7 is loaded in the direction toward the chamber 8 and in the direction to close the valve seat 15 against sealing ring 13. In this closed position of valve 13, 15 the valve chamber 11 is shut off or disconnected from the opening 14 to the atmosphere.

Piston 20 which is also subjected to the action of release pressure on its side toward the chamber 9 is displaced in the direction of chamber 21 until the outer peripheral edge of piston 20 contacts a stop in the form of an annular shoulder 28 formed on the interior of the valve housing as may be seen in FIG. 2.

In order to effect a braking action, a suitable braking signal transmitted in control line 1 actuates brake valve 2 to introduce a pressure decrease into brake line portions 3, 5a and 5b. This decrease of pressure is also transmitted into the chamber 9. However, since only a small quantity of air can flow out of chamber 8 through the constricted opening 18 a difference of pressure will be established between chambers 9 and 8 and this pressure difference loads the piston 7 in the direction of displacement toward the chamber 9. As soon as this pressure difference attains a predetermined but still relatively low level, the piston 7 will be displaced accordingly and valve seat 15 will be separated from the sealing ring 13 to open valve 13, 15. The compressed air will then be rapidly exhausted to the atmosphere from brake line 3, 5a, 5b through valve chamber 11 and the opening 14 which has a relatively large cross-sectional area. A rapid and powerful decrease of pressure is then quickly obtained in the brake line 3, 5a, 5b and in the spring-loaded brake cylinder 6.

As result of this rapid exhausting of a large quantity of air, the pistons of the spring-loaded brake cylinders 6 are quickly displaced and shifted under the action of their loading springs so as to effect contact of the vehicle brake by bringing the brake shoes into contact with the braking surfaces. Thus, when the level of contact pressure is attained in brake line 3, 5a and 5b the vehicle brakes are applied by the spring-loaded brake cylinders 6. A short time before this level of contact pressure is attained, compression spring 22 will be able to shift the piston 20 into the direction toward piston 7 so that both pistons 20 and 7 will be coupled through the abutment coupling 26. When brake contact pressure is attained in chamber 9, compression spring 22 will be able to continue the displacement of piston 20 together with coupled piston 7 until valve seat 15 again engages sealing ring 13 so as to close off the valve chamber 11 from the opening 14. Accordingly, the valve 13, 15 will be again closed after the vehicle brakes have been rapidly applied as result of the evacuation of a large quantity of compressed air through opening 14 to the atmosphere.

Further regulation of the braking action so as to vary the braking force exerted is achieved solely through the brake valve 2. In order to increase the braking action, the valve 2 will introduce a precise decrease of pressure in brake line 3, 5a, 5b which decrease could eventually reach the level of atmospheric pressure for a full application of the brakes. In order to reduce the braking effect, the brake valve 2 will introduce suitable and precise pressure increases into the brake line 3, 5a, 5b. During this control of the braking action by increasing or decreasing the braking action, the valve 13, 15 will be maintained closed by the force of the compression spring 22. The rapid brake application valve 4 thus exerts no influence in any subsequent regulation or control of the braking action.

After braking has been completed and the brakes are to be released, the brake valve 2 will introduce an increase in pressure into the brake line 3, 5a, 5b which increase causes the pressure to increase above the contact pressure up to the level of the release pressure. When the contact pressure is exceeded, the second piston 20 will be moved back against the force of spring 22 by the contact pressure prevailing in chamber 9 until the piston 20 engages stop 28. The compressed air flows rapidly through constricted opening 18 and around the ring or check valve 17 which is separated unilaterally from the wall of the groove 16 into the groove 16 and through bore 19 into the chamber 8. The pressure increases in chamber 8 to a degree almost parallel to the pressure increase occurring in chamber 9. As result of the differential structure of piston 7, the valve 13, 15 will remain closed also during this increase to the release pressure.

In order to simplify and reduce the costs of pipe connections, the brake line portions 3, 5a and 5b can be connected directly to the valve chamber 11 as shown in FIG. 3. Also, blind bore 27' in plunger 10 may be provided with transverse bores 29 that are permanently open to the valve chamber 11. In order to provide an improved connection between chamber 9 and valve chamber 11 the wall of bore 27' may be provided with a longitudinal groove 30. As a modification, the longitudinal groove 30 may also be formed in the plunger 25. Providing of a longitudinal groove in either the plunger or wall of the bore a special pipe connection is eliminated between chamber 9 and the brake line.

As a further modification the bore 19 in piston 7 can be closed and chamber 8 permanently connected to the atmosphere. An adjustable compression spring 22' is then positioned in chamber 8 and this spring loads the piston 7 in the direction of displacement toward the chamber 9. The initial tension of such a spring will equal the force exerted by the piston 7 at the release pressure level load acting on the side of the piston 7 to chamber 9. When the pressure in chamber 9 drops below the pressure release level the spring 22' in chamber 8 will open valve 13, 15 by shifting the piston 7 in the direction toward chamber 9 until contact pressure is established in chamber 9 at which time the compression spring 22 will become effective to again close valve 13, 15 by displacement of both pistons 20 and 7 as described above. In such a construction, the spring 22 must be stronger than the spring 22' employed in chamber 8 to load piston 7. However, by providing piston 20 with a diameter which is greater than that of piston 7 a structure relationship will be obtained wherein when the pressure in chamber 9 is lowered from release pressure to the contact pressure, the compression spring 22 will become effective only subsequently to the operation of the weaker spring 22' in chamber 8 loading piston 7.

According to the present invention the piston 20 may be constructed as a differential piston. The spring 22 can then be replaced by an air spring which can be charged by the release pressure through a check valve. The smaller surface area of the differential piston is thus loaded from the chamber 21 disconnected from the atmosphere and constantly subjected to the action of the release pressure.

Figure 4:
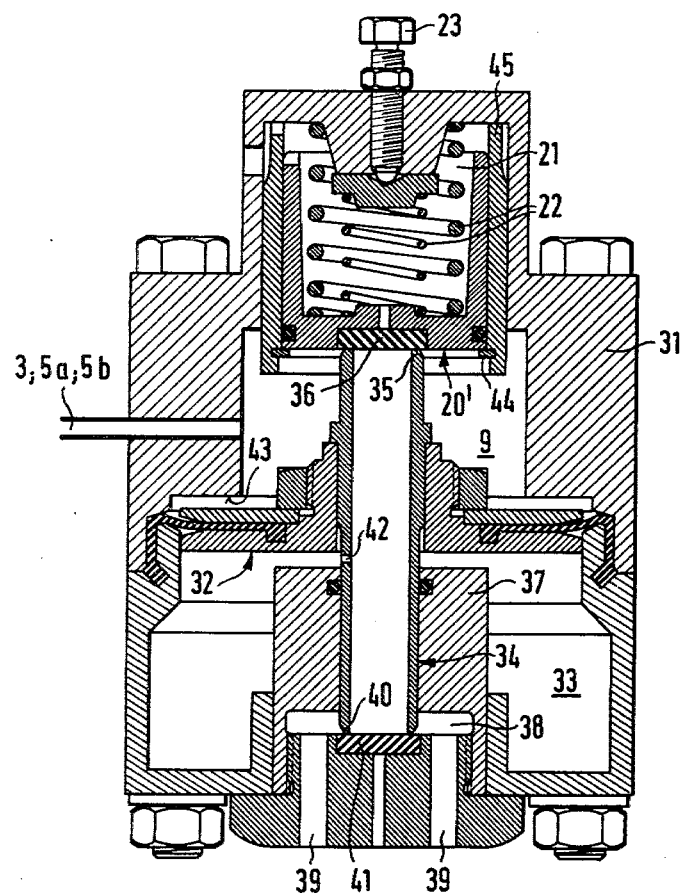
FIG. 4 is a sectional view of a further modification of the rapid brake contact valve of the present invention.

A further modification of the rapid brake application valve is shown in FIG. 4. This modification has a valve housing 31 in which is displaceably mounted a piston 20' one side of which is acted upon by pressure in chamber 9 and the other side to which is acted upon by the initial tension of compression springs 22 whose force is adjustable by set screw 23. The chamber 21 which encloses the compression springs 22 is vented to the atmosphere and chamber 9 is connected with the portion 3 of brake line 3, 5a, 5b and also portions 5a and 5b are connected to the chamber 9 in a manner which is not shown. The chamber 9 thus functions simultaneously as a distribution chamber.

The chamber 9 is separated by a diaphragm piston 32 from a chamber 33. Diaphragm piston 32 is provided with a central opening through which passes a valve tube 34 having one end ending in chamber 9 and provided with a valve seat 35 engageable with a sealing plate 36 mounted on the piston 20'. The other end of valve tube 34 extends through chamber 33 and is slidably and sealingly guided in a housing wall 37. The end of the valve tube is provided with a valve seat 40 engageable with a sealing plate 41 mounted in the housing and located in a chamber 38 which is constantly vented to the atmosphere through openings 39 have a large cross-section. That portion of the wall of valve tube 34 which is within chamber 33 is provided with a transverse bore 42 which is in the form of a constricted or throttle opening.

In chamber 9 there is formed a shoulder 43 on the housing which is engageable with the diaphragm piston 32 to limit the stroke of the piston 32 and is located at a space from the piston corresponding to the opening stroke of valve 40, 41. A locking ring 44 is seated in a portion of the valve housing to form a stop which stops the displacement of piston 20' in the direction of movement toward chamber 9. The piston 20' is detained in a position wherein both valve seats 35 and 40 are closed as result of contact with the respective sealing plates 36 and 41. The stop ring 44 also functions to remove the load of compression springs 22 from the both of the valves 35, 36 and 40, 41. In order to precisely locate the stop 44, the locking ring forming the stop 44 is seated in an annular groove formed in a sleeve 45 which is firmly attached to the housing 31. The sleeve 45 can be dimensioned so as to be precisely and accurately inserted and also functions as a cylinder for the piston 20'.

The sleeve 45 can also be adjustably mounted to the housing 31 so that the sleeve 45 can be located in different positions.

When the pressure in the brake line 3, 5a and 5b is of the brake release level, the chambers 9 and 33 of the valve of FIG. 4 are also under such pressure. The piston 20' will be pressed upwardly against the force of compression springs 22 into its end position in which the piston 20' abuts the end of the housing wall which forms the chamber 21 and the valve 35, 36 is opened. Valve 40, 41 on the other side of the housing is closed since the pressure in chamber 9 loads valve tube 34 in the direction pressing valve seat 40 against sealing plate 41. The pressure in chamber 9 acts upon an annular surface defined by the outer and inner diameters of the valve tube 34. With valve 35, 36 opened, chambers 9 and 33 are in communication with each other through valve tube 34 and the constricted opening 42.

When the pressure in brake line 3, 5a, 5b is decreased to initiate a braking action, the pressure is also decreased in chamber 9, but the pressure in chamber 33 is maintained at a substantially high level by the constricted opening 42. The pressure difference acting upon diaphragm piston 32 lifts piston 32 until it abuts stop 43. The movement of the piston 32 against stop 43 will lift valve tube 34 to separate valve seat 40 from sealing plate 41 to open valve 40, 41. The valve 35, 36 remains open during this opening of valve 40, 41. The compressed air then flows from chamber 9 and brake line 3, 5a, 5b through the large cross-sectional openings formed by open valves 35, 36 and 40, 41 to the atmosphere which causes the pressure in the spring-loaded brake cylinders to be rapidly decreased.

When the contact pressure of the spring-loaded brake cylinders is attained in chamber 9, compression springs 22 will shift piston 20' until sealing plate 36 engages valve seat 35 to close valve 35, 36. Closing of this valve will stop the venting of chamber 9 through valve tube 34. Diaphragm piston 32 remains in contact with housing stop 43. Accordingly, valve 35, 36 is closed in a precisely defined position of valve seat 35 within housing 31 solely by balancing the pressure prevailing in chamber 9 against the force exerted by the compression springs 22. The closing of valve 35, 36 can thus occur at a particular switching pressure which can be adjusted very precisely.

While the valve 40, 41 is still open, the chamber 33 will be exhausted through constriction 42 to the atmosphere until the pressure in chamber 33 decreases to approximately the level of the pressure in chamber 9. After the closing of valve 35,36 this pressure decrease occurs at a slower rate merely by venting through the brake valve so that compression springs 22 can shift piston 20' and valve tube 34 together with diaphragm piston 32 until piston 20' stops against housing stop 44 and valve tube 34 engages sealing plate 41. This action closes valve 40, 41 valve 35, 36 remains in the closed position. As the pressure in chamber 9 is further decreased, the force exerted by springs 22 on valve tube 34 is increased so that after the chamber 33 is isolated by the closing of valve 40, 41, there will be a pressure difference acting upon the diaphragm piston 32. This pressure difference will increase as result of further evacuating of chamber 9 through the brake valve such that valve 40, 41 will be slightly opened again for a short period of time. This opening of valve 40, 41 will further decrease the pressure in chamber 33 as air is vented through constriction 42. Valve 35, 36 will remain closed during this action so that a repeated emptying of chamber 9 through valve 35, 36 does not occur. Since the piston 20' is stopped against further movement by the stop 44, valve seats 35 and 40 can be pressed only with moderate force into the sealing plates 36 and 41 so that these sealing plates are protected.

When the brakes are to be released after a braking operation, when the pressure is increased in chamber 9 to the level of contact pressure the piston 20' will be separated from valve seat 35 against the force of springs 22 and valve 35, 36 is opened. The compressed air then flows from chamber 9 through constrictions 42 into chamber 33 which then becomes pressurized. The diaphragm piston 33 remains during this function in its illustrated position wherein valve 40, 41 is closed.

Thus it can be seen that the present invention has disclosed a venting or rapid brake application valve which during a braking operation functions only until braking contact is achieved. Further braking action is achieved through the brake valve.

It will be understood that this invention is susceptible to modification in order to adapt it to different usages and conditions, and accordingly, it is desired to comprehend such modifications within this invention as may fall within the scope of the appended claims.

What is claimed is:

1. A venting valve for a spring-loaded brake device particularly in a railway vehicle and connected to a brake line to which is further connected a spring-loaded brake cylinder and a brake valve to control pressure in the brake line, said venting valve comprising means in said venting valve for opening a passage from the brake line to the atmosphere only when the pressure in the brake line is decreased from a brake release level to a level at which the brake cylinder effects contact between braking surfaces but before a braking force is applied, said passage being otherwise closed at the brake release level and after contact of the braking surfaces is effected such that the brakes are applied with a force proportional to the decrease in the brake line pressure and the venting valve exerts no influence in any subsequent control of the braking action.

2. A venting valve as claimed in claim 1 and further comprising a valve housing having an opening therein to said atmosphere passage, a valve engageable with said opening to close and open said passage, a first piston operatively connected to said valve and subjected to pressure in said brake line in the closing direction of said valve, means for loading said first piston opposed to the brake line pressure, a second piston having one side subjected to pressure in said brake line and means actuated by said second piston for moving said valve into its closed position, a first spring acting upon said second piston against the pressure of said brake line in a direction to close said valve, said spring having a force greater than the force loading said first piston against the brake line pressure.

3. A venting valve as claimed in claim 2 wherein said first piston comprises a differential piston and defining on one side a first chamber and on its other side a second chamber, said one side of said piston having a smaller surface area than said other side thereof and subjected to a pressure in the opening direction of said valve, said brake line connected to said second chamber such that said larger area other side of said first piston is subjected to brake line pressure, and means including a check valve and constricted opening for connecting said first and second chambers.

4. A venting valve as claimed in claim 3 wherein said second piston has a third side facing to said second chamber, the area of the other side of said first piston being less than the area of said third side of said second piston.

5. A venting valve as claimed in claim 3 and a wall in said valve housing spaced from said valve opening to define a third chamber within said housing and having an opening therethrough, said third chamber connected to said brake line, a first plunger on said first piston slidably and sealingly passing through said wall opening into said third chamber and operatively connected to said valve, there being a coaxial bore through said first piston and into said first plunger, and a second plunger on said second piston extending into said second chamber and slidably received within said coaxial bore.

6. A venting valve as claimed in claim 5 wherein said coaxial bore and second plunger have an air passage therebetween from said third chamber to said second chamber.

7. A venting valve as claimed in claim 3 wherein said means for loading said first piston opposed to said brake line pressure comprises an opening to the atmosphere in said second chamber and a second spring acting upon said first piston such that both atmospheric pressure and said second spring load said first piston in the opening direction of said valve.

8. A venting valve as claimed in claim 1 and further comprising a valve housing having an opening therein to said atmosphere passage, a third piston defining one side thereof a fourth chamber and on the other side thereof a fifth chamber, said fourth chamber being connected to the brake line, means for defining a constricted passage between said fourth and fifth chambers, a valve tube passing through said third piston and having one end within said fourth chamber, a fourth piston having one side thereof facing to said fourth chamber and having a first valve member thereon engageable with said one end of said valve tube to define therewith a second valve, said fourth piston having another side and a third spring acting upon said other side, there being a sixth chamber within said housing open to the atmosphere and a second valve member within said sixth chamber, said valve tube having a second end extending into said sixth chamber and engageable with said second valve member to define therewith a third valve.

9. A venting valve as claimed in claim 8 wherein said constricted passage means is in a portion of a wall of said valve tube within said fifth chamber.

10. A venting valve as claimed in claim 8 wherein said valve housing has a stop therein engageable by said third piston in its direction of movement toward said fourth chamber.

11. A venting valve as claimed in claim 8 wherein said valve housing has a second stop therein engaged by said fourth piston in its direction of movement toward said fourth chamber when said second and third valves are closed.

12. A venting valve as claimed in claim 2 wherein said first spring is adjustable.

13. A venting valve as claimed in claim 2 wherein said first and second pistons are coaxial and define therebetween a second chamber.

14. A venting valve as claimed in claim 5 and further comprising a plurality of spring-loaded brake cylinders connected to the brake line, said brake line having a portion thereof leading to the brake valve connected to said second chamber and having a further portion thereof leading to the spring-loaded brake cylinder connected to said third chamber.

* * * * *